US010212041B1

(12) United States Patent
Rastogi et al.

(10) Patent No.: US 10,212,041 B1
(45) Date of Patent: Feb. 19, 2019

(54) TRAFFIC PATTERN DETECTION AND PRESENTATION IN CONTAINER-BASED CLOUD COMPUTING ARCHITECTURE

(71) Applicant: Avi Networks, Santa Clara, CA (US)

(72) Inventors: Gaurav Rastogi, San Francisco, CA (US); Sreeram Iyer, Cupertino, CA (US)

(73) Assignee: Avi Networks, Santa Clara, CA (US)

( * ) Notice: Subject to any disclaimer, the term of this patent is extended or adjusted under 35 U.S.C. 154(b) by 275 days.

(21) Appl. No.: 15/268,102

(22) Filed: Sep. 16, 2016

Related U.S. Application Data

(60) Provisional application No. 62/304,043, filed on Mar. 4, 2016.

(51) Int. Cl.
*G06F 15/173* (2006.01)
*H04L 12/24* (2006.01)
*H04L 12/26* (2006.01)
*H04L 29/08* (2006.01)
*H04L 29/06* (2006.01)

(52) U.S. Cl.
CPC ............ *H04L 41/12* (2013.01); *H04L 43/04* (2013.01); *H04L 43/08* (2013.01); *H04L 63/205* (2013.01); *H04L 67/10* (2013.01); *H04L 67/101* (2013.01)

(58) Field of Classification Search
CPC .......... H04L 41/12; H04L 43/04; H04L 43/08; H04L 63/205; H04L 67/10; H04L 67/101
See application file for complete search history.

(56) References Cited

U.S. PATENT DOCUMENTS

| | | | | |
|---|---|---|---|---|
| 9,467,476 | B1* | 10/2016 | Shieh | ................... H04L 63/20 |
| 9,716,617 | B1* | 7/2017 | Ahuja | ................. H04L 67/1031 |
| 2017/0063933 | A1* | 3/2017 | Shieh | ................... H04L 63/20 |
| 2018/0088935 | A1* | 3/2018 | Church | ................ G06F 11/302 |
| 2018/0136931 | A1* | 5/2018 | Hendrich | ............. G06F 11/302 |

* cited by examiner

*Primary Examiner* — Mohamed A Wasel
(74) *Attorney, Agent, or Firm* — Van Pelt, Yi & James LLP

(57) ABSTRACT

Determining and presenting traffic patterns includes: obtaining a first set of traffic metrics pertaining to network traffic associated with a plurality of containers of a container-based cloud computing platform, wherein: the plurality of containers supports a plurality of microservices; and a microservice has one or more corresponding microservice instances that execute on one or more of the plurality of containers; transforming the first set of traffic metrics into a second set of traffic metrics, the second set of traffic metrics comprising network traffic information pertaining to at least some of the plurality of microservices, the transformation being based at least in part on information pertaining to the plurality of containers and the plurality of microservices supported by the plurality of containers; constructing a microservice map based on the second set of traffic metrics; and outputting the microservice map.

21 Claims, 10 Drawing Sheets

TRAFFIC PATTERN DETECTION AND PRESENTATION IN CONTAINER-BASED CLOUD COMPUTING ARCHITECTURE

CROSS REFERENCE TO OTHER APPLICATIONS

This application claims priority to U.S. Provisional Patent Application No. 62/304,043 entitled MICROSERVICE MAP filed Mar. 4, 2016 which is incorporated herein by reference for all purposes.

BACKGROUND OF THE INVENTION

Cloud computing is a type of network-based computing architecture that provides shared resources, data, and services on demand. In a cloud-based computing platform, pools of configurable computing resources (e.g., processors, memory, storage, applications, services, etc.) are shared by client devices as needed.

In traditional virtual machine-based cloud computing architecture, multiple instances of virtual machines execute on a physical host. Each virtual machine instance runs its own copy of the operating system in which one or more application/service instances execute and can consume a significant amount of processing and memory resources. In response, container-based cloud computing architecture has been developed. The container-based architecture is a highly efficient type of cloud computing solution. Unlike the traditional virtual machine-based architecture, in a container-based cloud computing architecture, a single instance of an operating system supports multiple containers in a single physical host. A single microservice can be implemented using multiple instances of containers that are not necessarily on the same host.

Containers themselves do not require Internet Protocol (IP) addresses when transmitting data packets with other containers. Further, in some cases, a container can have a virtual IP address that is behind a Network Address Translation (NAT) layer therefore not visible to routers and switches outside the host. These characteristics of container traffic make it difficult to inspect packets between different applications and containers using traditional network management and security tools (such as network probes on routers or switches that detect traffic). As a result, monitoring, provisioning, and protecting container-based cloud computing platforms can be difficult using traditional tools that rely on inspecting IP addresses of packet headers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traffic pattern detection on a container-based cloud computing platform is disclosed. Traffic metrics pertaining to network traffic associated with a plurality of containers of a container-based cloud computing platform are transformed into traffic metrics pertaining to microservices. A microservice map is constructed based on the transformed traffic metrics and output. Additional actions such as network policy recommendations and/or configurations can take place based on the microservice map.

Figure 1:
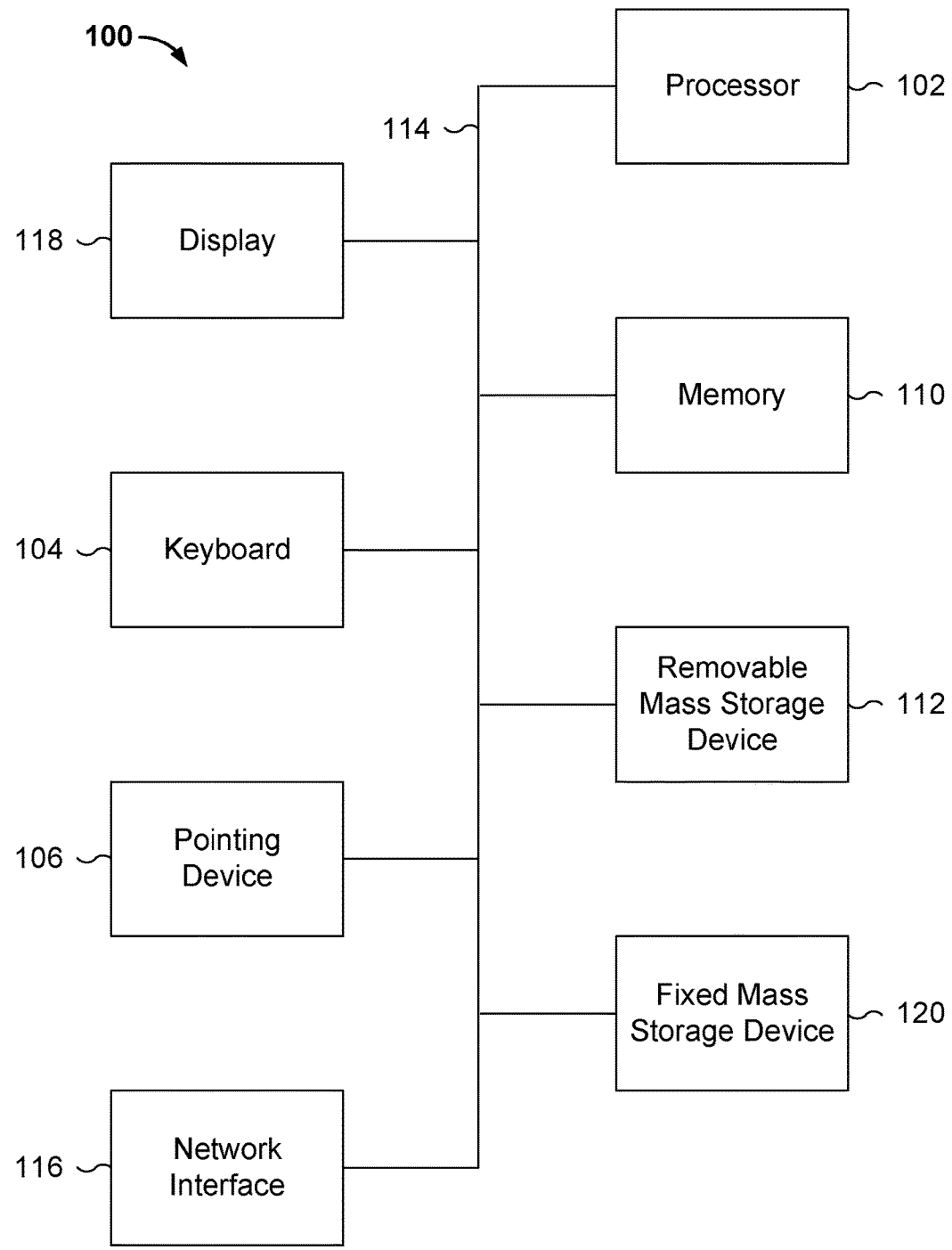
FIG. 1 is a functional diagram illustrating a programmed computer system for performing traffic pattern detection in accordance with some embodiments.

FIG. 1 is a functional diagram illustrating a programmed computer system for performing traffic pattern detection in accordance with some embodiments. As will be apparent, other computer system architectures and configurations can be used to perform traffic pattern detection functions. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, processor 102 controls the reception and manipulation of input data, and the output and display of data on output devices (e.g., display 118). In various embodiments, processor 102 supports standard operating systems as well as operating systems implementing containers. In some embodiments, processor 102 includes and/or is used to implement one or more service engines and/or servers as discussed below, as well as to execute/perform the various processes described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, storage area network elements, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
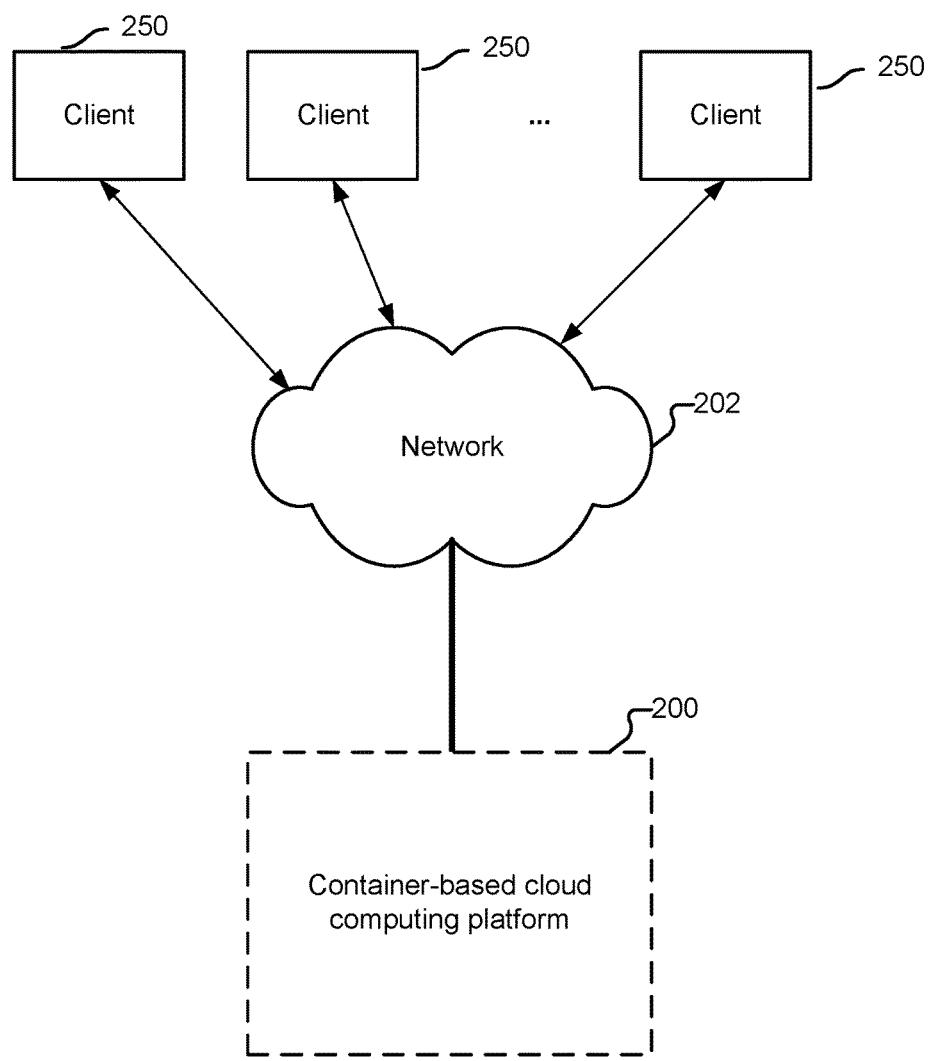
FIG. 2 is a block diagram illustrating an embodiment of a container-based cloud computing environment.

FIG. 2 is a block diagram illustrating an embodiment of a container-based cloud computing environment. In the example shown, client devices 250 can be computers, tablets, smartphones, mobile devices, or any other appropriate devices. Container-based cloud computing platform 200 can be within a data center network, an enterprise network, or any other appropriate network. Details of container-based cloud computing platform 200 are described below. Client devices 250 communicate with container-based cloud computing platform 200 via a network 202 (e.g., the Internet) to access various services offered by platform 200.

Figure 3:
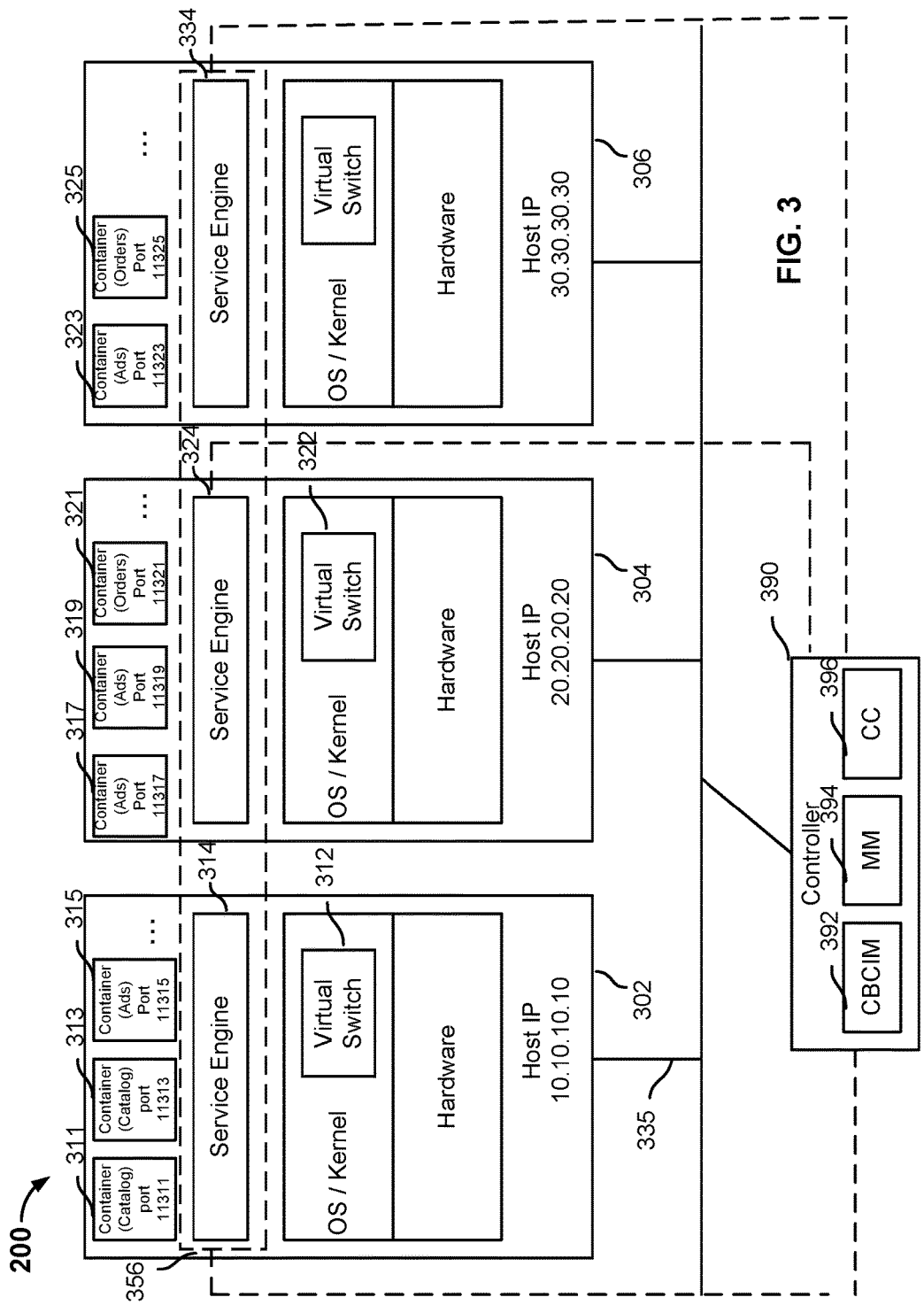
FIG. 3 is a block diagram illustrating an embodiment of a container-based cloud computing platform.

FIG. 3 is a block diagram illustrating an embodiment of a container-based cloud computing platform.

In this example, platform 200 includes a number of devices (e.g., multiple host computers or a multicore server comprising multiple processing cores). A physical device (e.g., 302, 304, 306, etc.) has hardware components on which software components operate. A physical device can be implemented using a system such as 100 of FIG. 1. In particular, hardware of the device supports a container-based cloud computing architecture by implementing appropriate software such as Apache Mesos, Docker, and Kubernetes. Other container-based cloud computing implementations can be used.

Containers 311-325 are configured to execute on host devices 302-306. Containers support certain microservices (also referred to as applications). A microservice can have more than one corresponding instance (e.g., multiple processes) executing on more than one device. As shown, an instance of a microservice executes within a container. The execution of an instance of a microservice is supported by physical resources such as one or more processors and one or more memories. The number of containers on each host device, the number of host devices, and the distribution of containers and microservices are configurable. As shown, two instances of the "Catalog" microservice are supported by containers 311 and 313; four instances of the "Ads" microservice are supported by containers 315, 317, 319, and 323; and two instances of the "Orders" microservice are supported by containers 321 and 325. The container provides support for the microservice, such as interfacing the microservice with operating system facilities such as memory management, file system, networking, input/output, etc. Unlike traditional virtual machines, a container does not need to run a complete operating system; rather, multiple containers share an operating system kernel installed within an operating system, making the container-based cloud infrastructure more lightweight than the traditional virtual machine-based cloud infrastructure. The kernel manages the containers, provides resource sharing, and interfaces between the containers and the rest of the operating system on the physical device, providing a layer of abstraction to the containers. The kernel makes it appear as though each container were running in isolation relative to other containers by facilitating system resources sharing amongst the containers. Container-based cloud infrastructure manager (CBCIM) 392 communicates with the kernels and containers to provide configuration, logging, and other management functions. CBCIM 392 can be a separate component from controller 390, or a part of controller 390 (as shown in this example). In some cases, the CBCIM is provided as part of the container-based cloud infrastructure implementation.

In this example, clients (not shown) communicate with servers, which are instances of microservices configured to execute within the container-based infrastructure. Examples of such microservices include web server applications, a shopping cart, user authentication, credit card authentication, order processing, cataloging, an advertisement server, an email, file sharing, virtual desktops, voice/video streaming, online collaboration, search, etc. Many other types of microservices can be implemented. The client can communicate with the microservices via a protocol such as Hypertext Transfer Protocol (HTTP), Remote Procedure Call (RPC), Structured Query Language (SQL) connection, or any other appropriate protocol. A distributed network service layer 356 is formed by service engines such as 314, 324, 334, etc., which are programs that provide network services to multiple microservice instances executing on different physical devices. As used herein, network services refer to services that pertain to network functions, such as load balancing, metrics monitoring and reporting, authorization, security, content acceleration, analytics, application management, etc.

One or more service engines (e.g., 314) are instantiated on a physical device. In some embodiments, a service engine is implemented as a program executing in a container. The service engine is executed to provide distributed network services for applications executing on the same physical device as the service engine, and/or for applications executing on different physical devices. In some embodiments, the service engine is configured to enable appropriate service components that implement service logic. For example, a load balancer component can be executed within a service engine to provide load balancing logic, specifically to distribute traffic load amongst instances of microservices executing on the local physical device as well as other physical devices. Firewalls and/or other types of network service components can also be implemented and enabled as appropriate. When a specific service is desired, a corresponding service component is configured and invoked by the service engine to execute in a container. The service engines also maintain mappings of microservice IDs and container IDs, and optionally host specific IP addresses, ports for the container, etc.

Within the operating system and/or kernel of the device, there are certain modules providing functionalities for the containers. One of the modules is a virtual switch (e.g., 312, 322, etc.). A physical hardware has one or more physical ports (e.g., Ethernet ports). Network traffic (e.g., data packets) can be transmitted or received by any of the physical ports, to or from any containers. The virtual switch is configured to direct traffic to and from one or more appropriate containers, such as the containers in which the service engine on the device is operating.

A virtual switch such as 312 interacts with the service engines, and uses existing networking Application Programming Interfaces (APIs) (such as APIs provided by the operating system) to direct traffic and provide distributed network services for microservices deployed on the network. The operating system and the microservices implement the API calls (e.g., API calls to send data to or receive data from a specific socket at an Internet Protocol (IP) address). In some embodiments, the virtual switch is configured to be in-line with one or more containers and intercepts traffic designated to and from instances of the microservices executing on the containers. When a networking API call is invoked, traffic is intercepted by the in-line virtual switch, which directs the traffic to or from the appropriate container on which instances of the microservice execute. In some embodiments, a service engine sends data to and receives data from a microservice via the virtual switch.

In this example, a controller 390 is configured to control, monitor, program, and/or provision the distributed network services and containers. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. In addition to CBCIM 392 which manages the containers and the microservice instances, the container further includes a cloud connector (CC) 396 that implements various application programming interfaces (APIs) and utilities to communicate with the CBCIM and obtain topology information, and a metrics manager (MM) 394 configured to collect traffic data and form a microservice map based on the collected traffic data. The controller and its functional components can be implemented as software, hardware, firmware, or any combination thereof. Various functional components such as 392-396 can be implemented as a part of the controller or as separate processes than the controller. Parts or all of the functional components can be combined in various embodiments.

The service engines cooperate to function as a single entity, forming a distributed network service layer 356 to provide network services to the microservices. In other words, although multiple service engines 314, 324, etc. are installed and running on multiple physical devices, they cooperate to act as a single layer 356 across these physical devices. In some embodiments, the service engines cooperate by sharing state information (e.g., load balancing state information, session information, container information, etc.).

In some embodiments, a single service layer is presented to the microservices to provide the microservices with network services. The interaction between the microservices and the service layer is transparent in some cases. For example, a load balancing service is provided by the service layer, and the microservice sends and receives data via existing APIs as it would with a standard, non-distributed load balancing device. In other words, from the perspective of a client or a server-side application targeted by the client, it is as if a single service layer object (specifically, a single load balancer) were instantiated and with which the client or microservice communicated, even though in some implementations multiple service engine objects (with multiple load balancing components) execute on multiple devices.

Traffic received on a physical port of a host (e.g., a communications interface such as Ethernet port 335) is sent to the virtual switch (e.g., 312). In some embodiments, the virtual switch is configured to use an API provided by the container-based infrastructure to intercept incoming traffic designated for the microservice(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed (e.g., replacing with different header information) and redirects the packets to the appropriate microservice. The service engine (in particular, the load balancing component within the service engine) performs load balancing functions. Specifically, based on load balancing factors such as configured rules and operating conditions, the service engine redirects the traffic to an appropriate microservice executing in a container on a host. This host can be the host on which the service engine is executing, or a different host.

Figure 4:
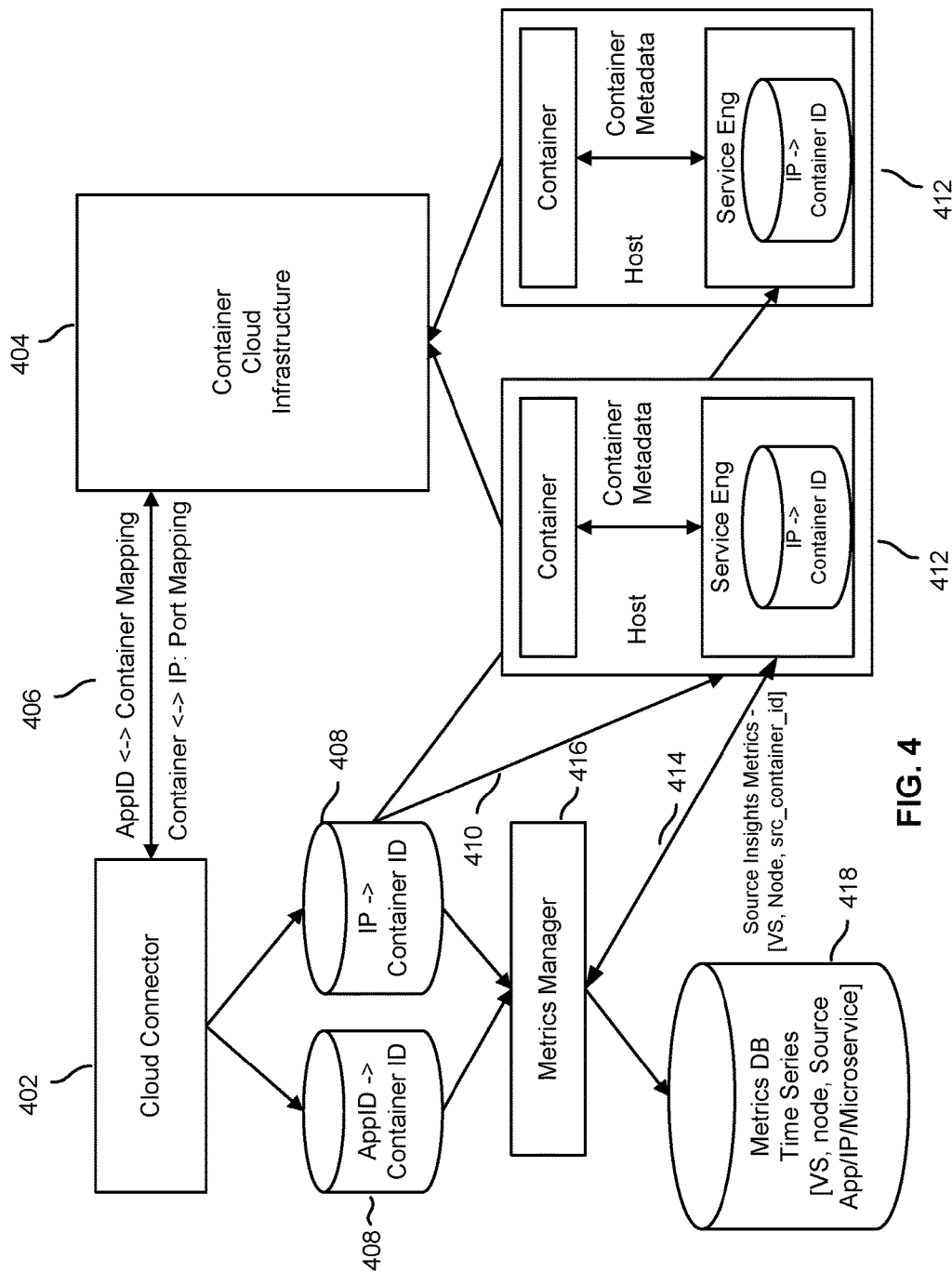
FIG. 4 is a block diagram illustrating in greater detail components used to detect traffic patterns and their associated data flow according to a container-based cloud computing platform embodiment.

FIG. 4 is a block diagram illustrating in greater detail components used to detect traffic patterns and their associated data flow according to a container-based cloud computing platform embodiment.

In this example, a cloud connector 402, which implements various library functions, application programming interfaces (APIs), and/or scripts, is used to communicate with container cloud infrastructure 404 (e.g., kernels and/or operating systems of the host devices). In this case, the containers are assigned unique container identifiers, and the microservices are assigned unique microservice IDs (also referred to as virtual service IDs or application IDs). The IDs can be Universally Unique Identifiers (UUIDs), serial numbers, or the like. The containers are assigned port numbers, and the hosts are assigned IP addresses. The cloud connector makes one or more API calls or invokes one or more scripts (406) to obtain mapping information of the microservice IDs, corresponding container IDs, host-specific IP addresses, and ports for the corresponding containers.

In response to the API call or script, the kernels of the host devices provide topology information, including mappings of microservices, their respective containers, the host-specific IP addresses and port corresponding to the respective containers, and virtual IP addresses. Referring to the example shown in FIG. 3, the following information is returned by the kernels of devices 302, 304, and 306 and collected into a table:

TABLE A

| Microservice ID | Container ID | Host IP:port |
| --- | --- | --- |
| Catalog | 311 | 10.10.10.10:11311 |
| Catalog | 313 | 10.10.10.10:11313 |
| Ads | 315 | 10.10.10.10:11315 |
| Ads | 317 | 20.20.20.20:11317 |
| Ads | 319 | 20.20.20.20:11319 |
| Ads | 323 | 30.30.30.30:11323 |
| Orders | 321 | 20.20.20.20:11321 |
| Orders | 325 | 30.30.30.30:11325 |

Although a single table is shown in this embodiment, separate tables can be used. Different topology information can be stored in other embodiments. For example, in some embodiments, microservice IDs have associated service:port for east-west configuration and virtual IP for north-south configuration. The mapping information such as Table A is stored in memory or other storage by the controller, at 408. Further, the mapping information is distributed to all the service engines (410). In this example, the controller sends the information according to a prespecified protocol. For example, the controller can send the table entries as a set of key-value pairs using one or more broadcast or multicast messages with a predefined format. The service engines store the mapping information locally, in databases such as 412.

The service engine obtains information pertaining to the containers on the same host, such as their IP addresses, container IDs, etc., via standard container utilities such as docker inspect and notifications. A service engine can inspect a packet's source IP field, use the stored mapping information to identify the source container generating the packet, track flow data (e.g., packet size, bandwidth, response time, etc.), and report metrics associated with the relevant container ID (or IP address) to metrics manager 416. In this example, the service engines collect traffic data in a distributed manner while handling load balancing requests for the microservices, and send metrics 414 relating to the traffic data to metrics manager 416.

Metrics manager 416 also has access to database 408 which maps IP addresses and container IDs to microservice IDs. When metrics from the service engines are received, metrics manager 416 performs lookups in database 408, and uses the found information to transform, record, and aggregate the metrics at the microservice level rather than at the individual container level. The aggregated metric is stored in a metrics database 418. In this example, the metrics database includes aggregated metrics that are collected according to different time granularities (e.g., minute, hour, day, week, and/or month-based granularities) to facilitate metrics data compression and storage.

Figure 5:
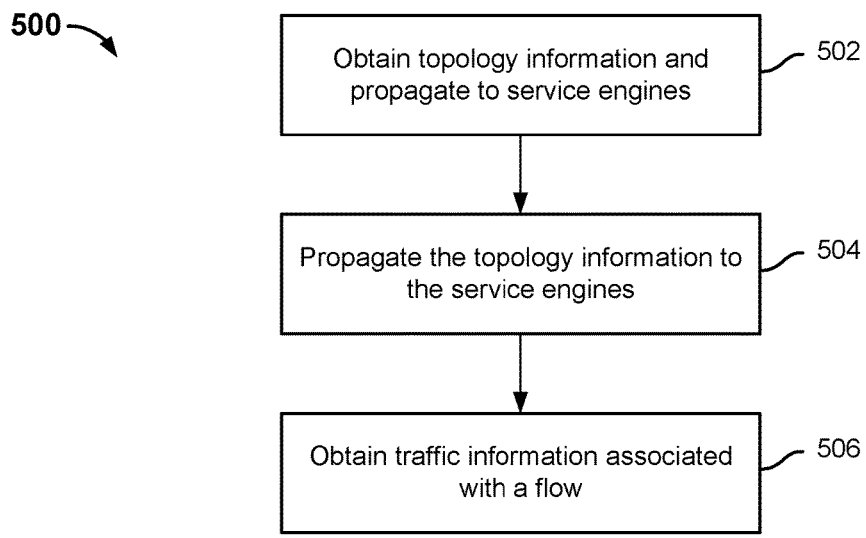
FIG. 5 is a flowchart illustrating an embodiment of a process for establishing container-level metrics data.

FIG. 5 is a flowchart illustrating an embodiment of a process for establishing container-level metrics data. Process 500 can be performed by a container-based cloud computing platform such as 200. In some embodiments, process 500 is performed by a controller such as 390.

At 502, topology information pertaining to the containers and microservices is obtained. Specifically, the container IDs and their corresponding microservice information are obtained. In some embodiments, a cloud connector on a host (e.g., CC 396) makes an API call or invokes a utility tool provided by the container-based infrastructure to obtain information about the containers and construct the topology information, such as a mapping of microservice IDs to container IDs and host specific IP addresses and ports is constructed (e.g., Table A).

At 504, the topology information is propagated to the service engines. This way, each service engine can maintain a local copy of the topology.

Once the topology information is available, the service engines will collect traffic data and send metrics to the metrics manager.

When a source microservice attempts to communicate with a destination microservice, the request from the source microservice is sent to a service engine, which load balances the request to an appropriate microservice instance. The service engine can be a local service engine residing on the same host as the source microservice or a service engine that is configured with the destination virtual IP. Traffic information (e.g., the source microservice, the destination microservice, the source container ID or IP address, data about the packet or flow such as the packet size, response time, connection losses, request type, etc.) is collected by the service engine by inspecting the packet when a request needs to be load balanced. The service engine selects an appropriate instance of microservice to send the request based on standard load balancing algorithms (e.g., round robin, least load, etc.). When the destination microservice instance responds, the response belongs to the same flow and has the same source and destination information as the request. Thus, additional traffic information associated with the response (e.g., response time) is also collected. At this point, the service engine collects traffic information on a per-container per-flow basis.

In some embodiments, the microservices are configured with corresponding virtual IP addresses (commonly referred to as a North-South configuration). A microservice is assigned a unique Fully Qualified Domain Name (FQDN), which is translated into a virtual IP address by a domain name server (DNS). Specifically, the DNS stores the mappings of FQDNs and virtual IP addresses for lookup purposes. In the example of FIG. 3, for instance, the "Catalog" microservice can be assigned an FQDN of "catalog.avinetworks.com," which maps to a virtual IP address of 1.1.1.1; the "Ads" microservice can be assigned an FQDN of "ads.avinetworks.com," which maps to a virtual IP address of 2.2.2.2; and the "Orders" microservice can be assigned an FQDN of "orders.avinetworks.com," which maps to 3.3.3.3, etc.

In some embodiments, the microservices are not configured with corresponding virtual IP addresses but with corresponding virtual service ports (commonly referred to as the East-West configuration). In the example of FIG. 3, for instance, the "Catalog," "Ads," and "Orders" microservices can be assigned port numbers of 20000, 20050, and 200100, respectively. In an East-West configuration, when a microservice instance attempts to send a request to another microservice, localhost:port number will be used as the destination address for the request packet.

When a source microservice instance needs to communicate with a destination microservice, the source microservice instance first communicates its request with its local service engine via the corresponding container supporting the source microservice instance, using facilities (e.g., API call and/or messaging service) provided by the container infrastructure. For purposes of example, an HTTP request is described. The HTTP request has a source IP address of 10.10.10.10:11311, and a destination IP address of "2.2.2.2" or "localhost:20050."

The service engine, upon receiving the request, extracts the source IP address from the HTTP request, and uses the service engine's local database to determine the container ID and microservice ID corresponding to the source IP address. For example, the source IP corresponds to 10.10.10.10:11311, which corresponds to the instance of Catalog microservice executing in container 311. The destination microservice's virtual IP address (or virtual service port) is indicated as the destination address of the request. For example, the destination address of "2.2.2.2" or "localhost:20050" can be used if the source microservice is attempting to communicate with the "Ads" microservice. The service engine can examine the destination virtual IP address (or virtual service port), and determine the corresponding destination microservice based on the mapping of virtual IP addresses (or virtual service ports) to microservices, and perform load balancing to direct the request to a specific instance of a microservice in a container. For example, the request can be load balanced to the "Ads" microservice instance executing in container 323.

The traffic information collected by the service engines is sent to the metrics manager. In some embodiments, the traffic information is sent periodically. In some embodiments, the traffic information is buffered by the service engines and sent when the metrics manager demands traffic information (such as when the metrics manager needs to provide data for creating a microservice map). Sending traffic information on-demand reduces load on the metrics manager and is more scalable for systems with a large number of hosts. The format of the traffic information depends on implementation and can vary for different embodiments. In this example, the traffic metrics are reported in messages with the keys of [Source Container ID, Source IP address, Destination IP address, Size]. Other metrics formats including other metrics parameters can be employed. In this example, the traffic metrics are time-stamped when they are stored.

At 506, in response to a request to detect traffic patterns, traffic information is received from the metrics manager, which collects traffic data gathered by the distributed network service layer. The traffic information can be collected per packet or per flow. Examples of the traffic information includes the source microservice, the destination microservice, the source container ID or IP address, data about the packet or flow such as the packet size, response time, connection losses, request type, etc.

Figure 6:
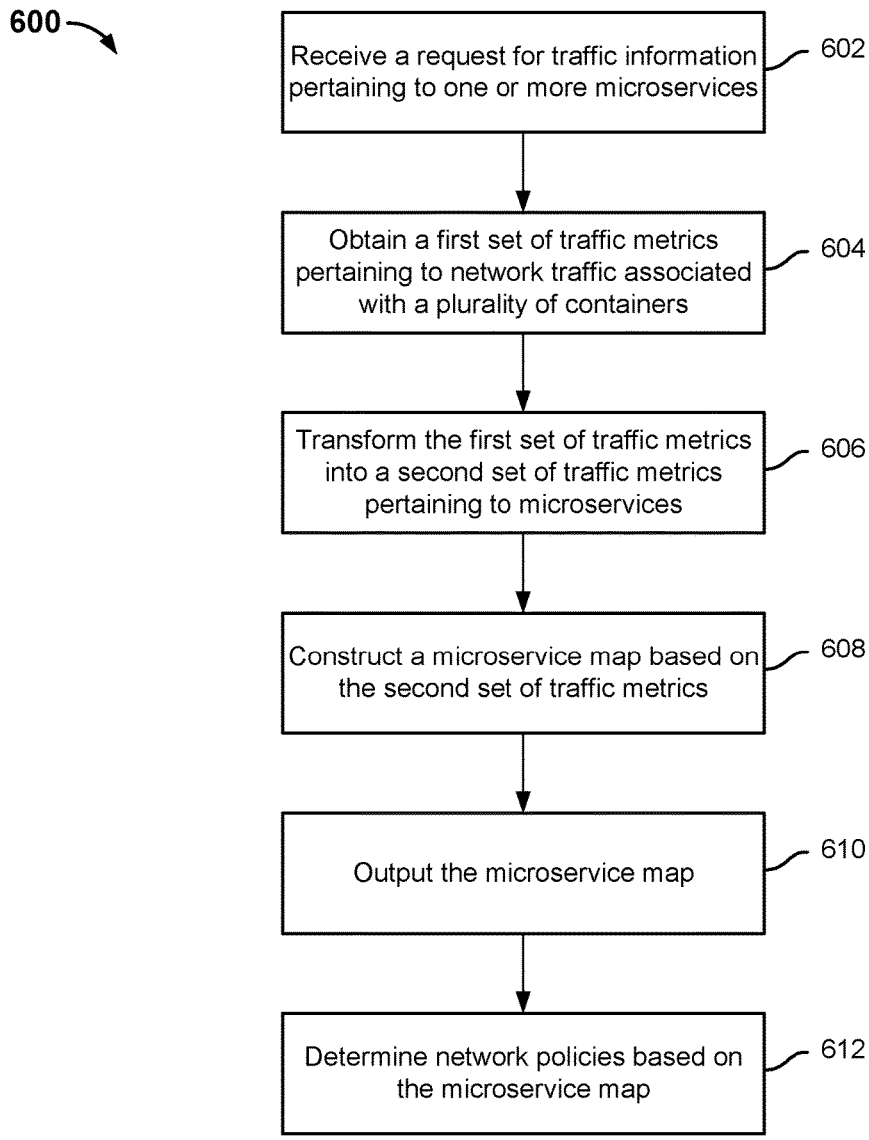
FIG. 6 is a flowchart illustrating an embodiment of a process for detecting traffic patterns in a container-based cloud computing architecture.

FIG. 6 is a flowchart illustrating an embodiment of a process for detecting traffic patterns in a container-based cloud computing architecture. Process 600 can be performed by a container-based cloud computing platform such as 200 of FIG. 3, and in particular by a controller such as 390 of FIG. 3. Process 600 can be used to implement 506 of process 500.

At 602, a request for traffic information pertaining to at least one microservice among the plurality of microservices is received. The request can be made, for example, in connection with a network management application that monitors the network and provides information to a user about the network. In some embodiments, the request specifies a time range (e.g., between 8 AM to 8 PM on a given day, after 6 AM today, within the last 30 minutes, within the past month, etc.) and a microservice used to construct a microservice map.

At 604, a first set of traffic metrics pertaining to network traffic associated with a plurality of containers is obtained. In this example, the first set of traffic metrics includes container-level metrics related to traffic that occurred during the specified time window. Metrics are collected by the service engines in the course of performing network services such as load balancing and firewall, and are sent to a controller such as 390 (and specifically by a metrics manager such as 394). In this example, the controller polls the service engines to request the metrics as needed to conserve bandwidth and processor cycles. Alternatively, the service engines can send metrics periodically to the controller.

The format of the metrics can vary depending on implementation. In this example, key value pairs are used to represent data in a metric. A metric includes information pertaining to traffic associated with a container that has sent one or more packets through the corresponding service engine. For example, the metric can include an identifier of a source container generating traffic (e.g., a network flow such as an HTTP session) associated with a microservice that is supported by the container, a source address associated with the traffic (e.g., a source IP address), a destination address associated with the traffic (e.g., a destination IP address), and information associated with the traffic (e.g., packet size, bandwidth, etc.). In a system where multiple service engines are generating metrics for multiple microservice instances, the obtained metrics will correspond to multiple source containers.

At 606, the first set of traffic metrics is transformed into a second set of traffic metrics. The transformation is based at least in part on information pertaining to the plurality of containers and the plurality of microservices supported by the containers, specifically mapping information of the containers and microservices. In various embodiments, the transformation can include modifying the first set of traffic metrics and/or generating the second set of metrics as new metrics.

In this example, the first set of traffic metrics is first transformed into modified traffic metrics associated with individual microservices of the plurality of microservices. For example, according to table A, a first metric that includes a container ID of 311 is transformed into a modified metric that corresponds to the "Catalog" microservice, and a second metric that includes a container ID of 313 is also transformed into a modified metric that corresponds to the "Catalog" microservice. The modified metrics are aggregated according to their respective microservices to generate the second set of traffic metrics, in this case a set of microservice-level metrics. For example, a bandwidth-related metrics can be aggregated according to the keys [time, source microservice ID (or source IP address), destination microservice ID (or destination IP address), bandwidth] to group together the amount of bandwidth between a particular source microservice and a particular destination microservice regardless of the specific containers. Using the previous example, suppose that the modified metric with a source microservice ID of "Catalog" resulting from container ID of 311 and the modified metric with a source microservice ID of "Catalog" resulting from the container ID of 313 are both destined for the microservice of "Ads," and have bandwidths of 2 kB/s and 3 kB/s, respectively, then the aggregated microservice-level metric has a bandwidth of 5 kB/s. Other types of metrics, such as connections/second, request/second, errors, bytes, number of packets, latency, etc., can be aggregated using corresponding keys.

At 608, a microservice map based on the second set of traffic metrics is constructed. As will be described in greater detail below, the microservice map depicts microservices on the network and the traffic between them within the specified time window.

At 610, the microservice map is output. The microservice map represents traffic information pertaining to at least some of the microservices during the specified time period. In this example, the microservice map is output to a network management application to be rendered in a display. The microservice map can also be output to a network policy analyzer to analyze the traffic patterns and determine appropriate network policies, to a storage element to be stored, etc. Details of the microservice map and its construction are described in greater detail below in connection with FIGS. 7-10.

Figure 7:
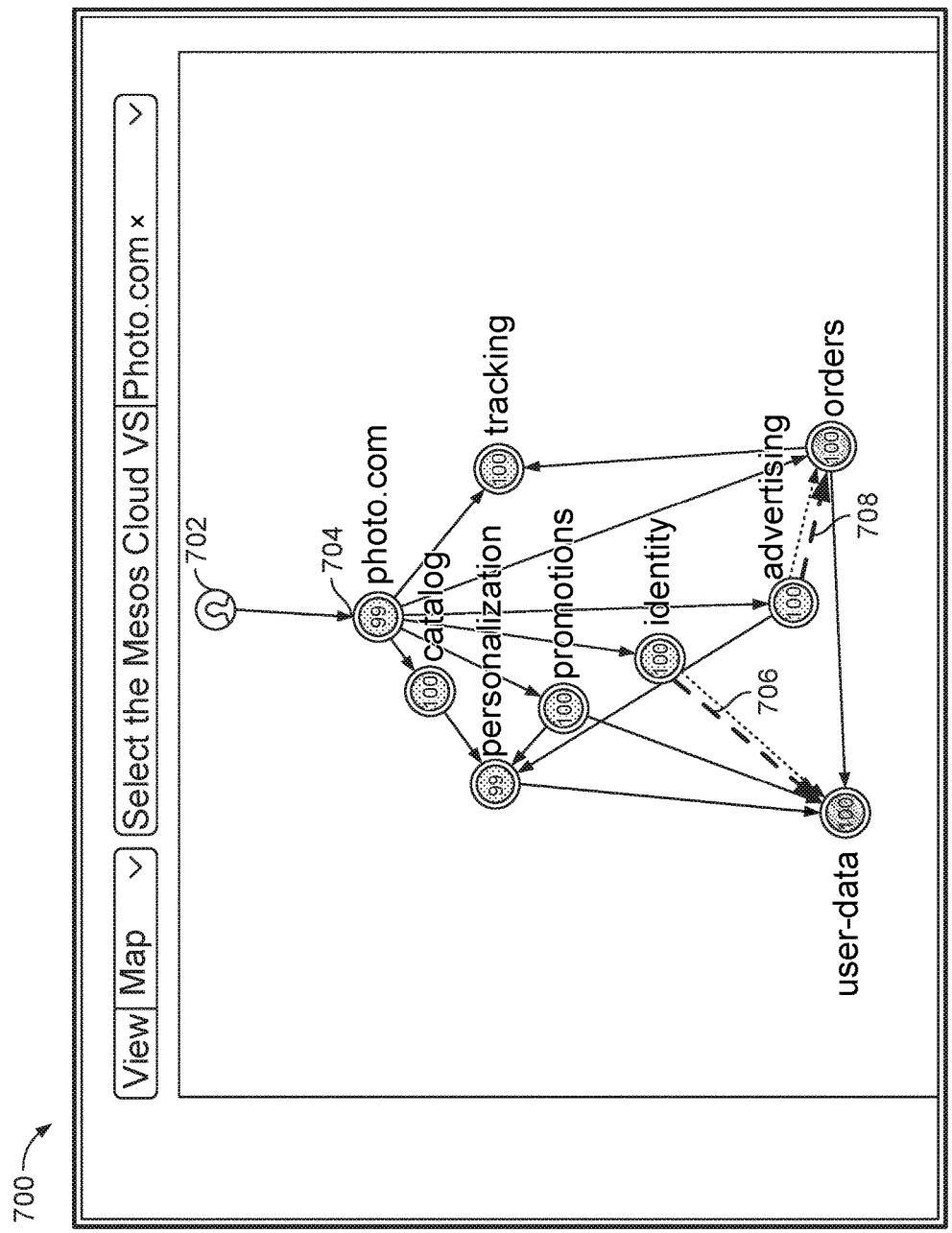
FIG. 7 is a diagram illustrating a microservice map example.

FIG. 7 is a diagram illustrating a microservice map example. In this example, microservice map 700 is created in response to a user request. The time window is set to be the past month. Map 700 provides network traffic topology between microservices (each of which has one or more containers) during the specified time window.

The map includes a directed graph in which the nodes represent various microservices. An exception is optional node 702 which represents a network node such as a client device or a networking element that accesses the container-based cloud computing platform. A root node (that is, the node that is reachable by other nodes on the map) 704 is configured by the user, in this case the root node is set to a microservice providing web service for photo.com. All nodes that exchanged traffic during this time window and that are reachable from the root node are shown. If there is no traffic during the specified time window, the map would only show the root node. Values such as 99, 100, etc. shown on the nodes represent the respective health scores.

In this case, the edges of the graph represent network traffic such as HTTP requests between two nodes. In this example, actual traffic metrics such as a bandwidth associated with two nodes can be displayed by clicking on an edge. In some embodiments, the traffic metrics are displayed next to the corresponding edges or in other appropriate locations. In this example, the edges of the graph are also compared with existing network policies to determine whether there are violations. In particular, policy rules specify that there should be no traffic between the "identity" microservice and the "user-data" microservice, or the "advertising" microservice and the "orders" microservice, but the graph indicates that during the specified time window there was traffic. Thus, edges 706 and 708 indicating traffic violations are rendered differently than the edges representing permissible traffic. In this example, the edges indicating traffic violations are dashed lines while the edges representing permissible traffic are solid lines.

To construct the microservice map, the second set of traffic data comprising aggregated microservice-level metrics is examined. In some embodiments, a breadth-first search is applied to find all the nodes that are reachable from the specified root node. Other search techniques such as depth-first search can also be used to construct the graph as appropriate.

In one implementation of a breadth-first search, a list of new nodes is maintained. Edges that match a new node (e.g., edges terminating at a node or emitting from the node) are examined, and any source or destination associated with the edges not already in the graph is added to the graph. Other implementations of breadth-first search can also be used.

The following is a set of example pseudocode for performing the breadth-first search:

```
new_nodes←root_node
for node in new_nodes
    edges=fetch all the edges that are either source or destination matching this node
        for source, destination in the edges
            if source not in graph then new_nodes.append (source)
            if destination not in graph then new_nodes.append (destination)
            add directed edge to the graph
```

Figure 8:
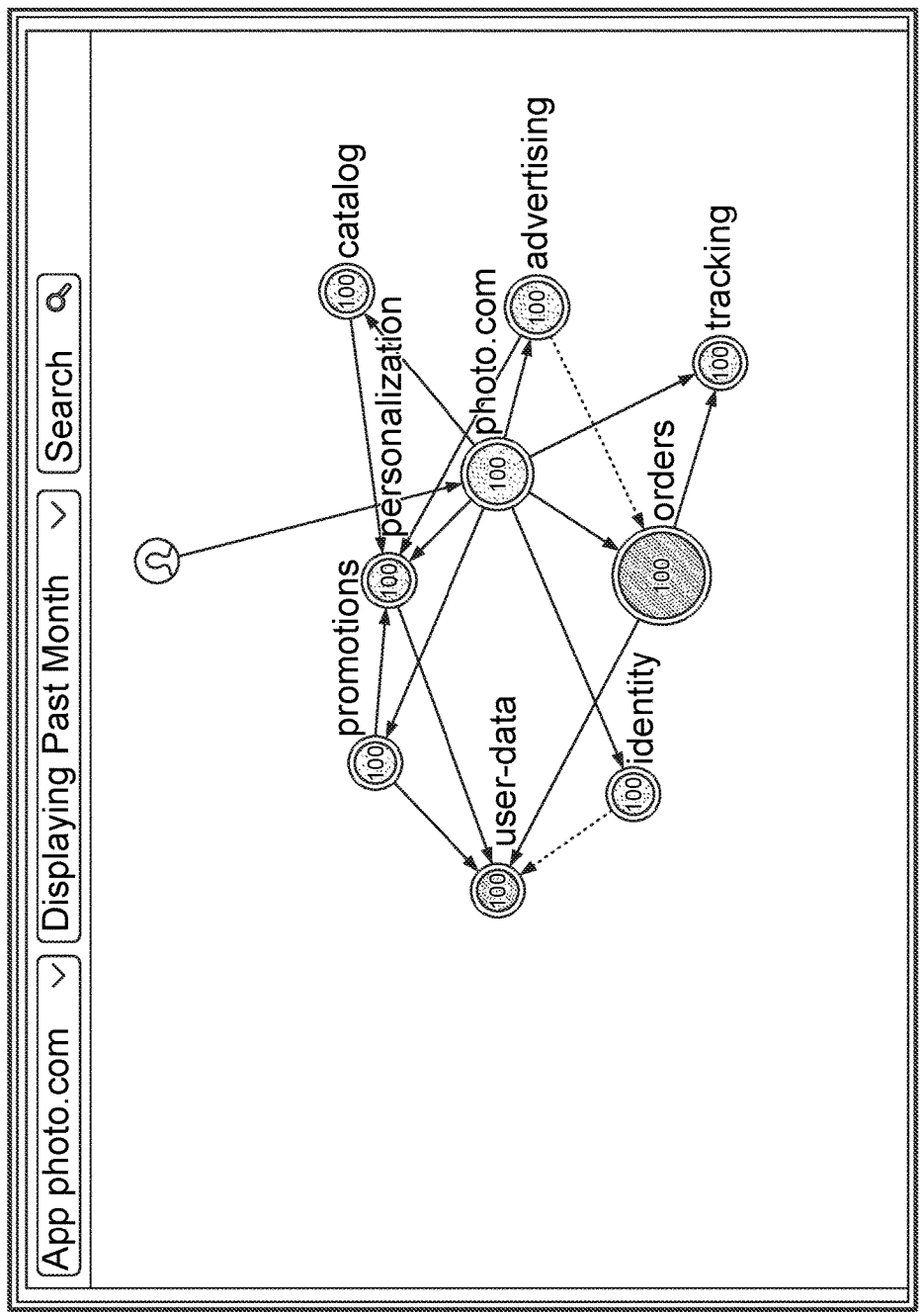
FIG. 8 is a diagram illustrating another embodiment of a microservice map.

FIG. 8 is a diagram illustrating another embodiment of a microservice map. In this example, the size of a node is proportional to the number of resources supporting the node, such as the number of containers, the number of CPUs, the amount of memory, etc. The user can select different measurement units and the map will render the sizes of the nodes according to the selection.

Figure 9:
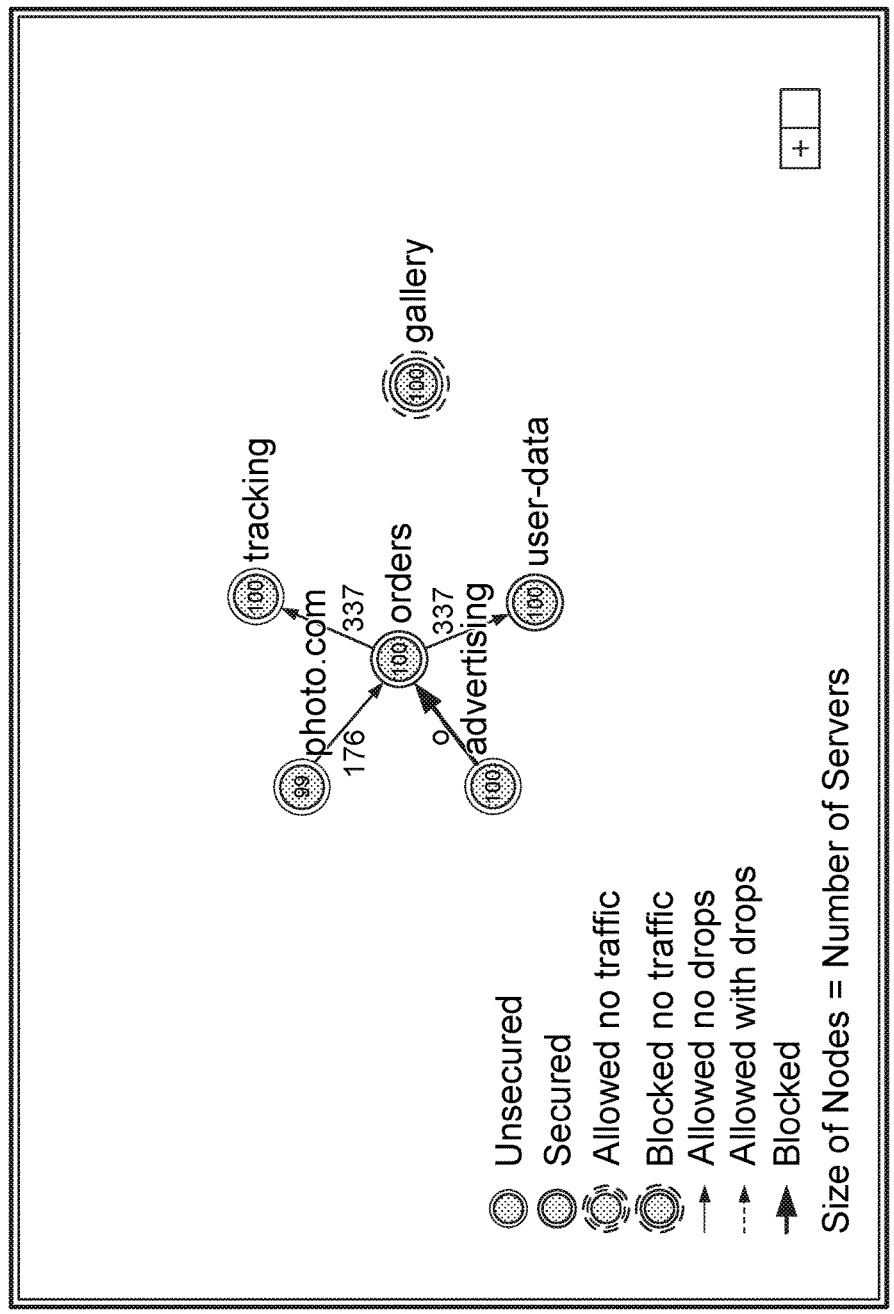
FIG. 9 is a diagram illustrating another embodiment of a microservice map.

FIG. 9 is a diagram illustrating another embodiment of a microservice map. In this example, additional symbols are used to illustrate traffic information pertaining to the nodes, such as whether a node is secured (e.g., protected by a firewall policy), whether a secured node had traffic violations during the time period of interest (in this case, whether a secured node had blocked traffic), whether packets were dropped between microservices during the time period of interest, etc. Many other symbols can be used.

Figure 10:
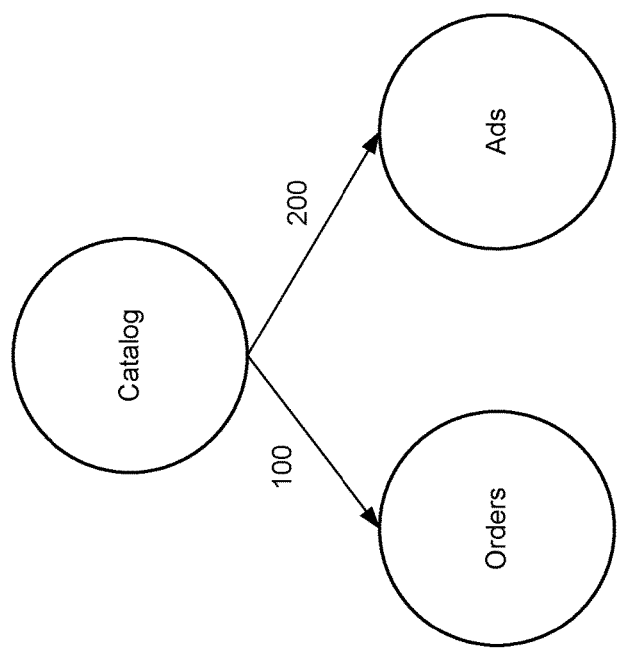
FIG. 10 is a diagram illustrating a simple example of a microservice map that is being constructed.

FIG. 10 is a diagram illustrating a simple example of a microservice map that is being constructed. In this example, two metric examples with the keys [time, source microservice ID, destination microservice ID, bandwidth] are used to construct the microservice map:

Metric example 1=[00:00:10, Catalog, Orders, 100]
Metric example 2=[00:00:15, Catalog, Ads, 200]

As shown, the node "Catalog" has two edges terminating at "Orders" or "Ads." The number next to the edge indicates the bandwidth between the source node and the destination node.

Returning to FIG. 6, at 612, one or more network policies are optionally determined based on the microservice map, and applied if deemed appropriate. The network policies can be applied by inspecting traffic patterns associated with the nodes (microservices) in the microservice map. An example of a network policy includes a firewall rule that specifies conditions (e.g., the source and/or destination of traffic) under which traffic is blocked or allowed. For example, if, based on the microservice map, it is determined that there is no traffic between two specific microservices, then a network policy (e.g., a firewall rule) blocking any traffic between the two nodes can be constructed; if it is determined that a first microservice will only communicate with a second microservice, then a network policy blocking all other microservices except the second microservice can be constructed. In some embodiments, possible network policies determined based on the microservice map are presented to the user via a network management application interface for the user to accept or reject specific network policies. Those policies that are accepted are applied to their corresponding nodes using appropriate policy management APIs or tools (e.g., firewall configuration utilities, etc.).

Traffic pattern detection and presentation in a container-based cloud computing architecture has been disclosed. The technique described herein makes it possible to determine and present traffic patterns on networks implementing container-based cloud computing architecture, and greatly facilitates visualization, configuration, and management of such networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      obtain a first set of traffic metrics pertaining to network traffic associated with a plurality of containers of a container-based cloud computing platform, wherein:
         the plurality of containers support a plurality of microservices; and
         a microservice has one or more corresponding microservice instances that execute in one or more of the plurality of containers;
      transform the first set of traffic metrics into a second set of traffic metrics, the second set of traffic metrics comprising network traffic information pertaining to at least some of the plurality of microservices, the transformation being based at least in part on information pertaining to the plurality of containers and the plurality of microservices supported by the plurality of containers;
      construct a microservice map based on the second set of traffic metrics;
      output the microservice map;
      determine a network policy based on the microservice map; and
      apply the network policy; and
   one or more memories coupled to the one or more processors and configured to provide the one or more processors with instructions.

2. The system of claim 1, wherein
   the network policy includes a firewall rule.

3. The system of claim 1, wherein the first set of traffic metrics includes information pertaining to:
   a container associated with a corresponding microservice that is supported by the container, a source address associated with a traffic flow, a destination address associated with the traffic flow, and metric data of the traffic flow.

4. The system of claim 1, wherein the first set of traffic metrics is gathered by a plurality of service engines that are distributed on a plurality of host devices and that perform load balancing on traffic sent by instances of the plurality of microservices.

5. The system of claim 1, wherein to transform the first set of traffic metrics into the second set of traffic metrics includes to:
   transform the first set of traffic metrics into a set of modified traffic metrics associated with individual microservices of the plurality of microservices; and
   aggregate the set of modified traffic metrics according to their respective microservices to generate the second set of traffic metrics; wherein
   the second set of traffic metrics includes microservice-level metrics.

6. The system of claim 1, wherein:
   the one or more processors are further configured to receive a request for traffic information pertaining to at least one microservice among the plurality of microservices; and the request for traffic information includes a time range specification, and the first set of traffic metrics is obtained according to the time range specification.

7. The system of claim 1, wherein the first set of traffic metrics includes a set of container-level metrics, and the second set of traffic metrics includes a set of microservice-level metrics.

8. The system of claim 1, wherein the microservice map includes a directed graph.

9. The system of claim 1, wherein the construction of the microservice map includes performing a breadth-first search.

10. The system of claim 1, wherein the microservice map represents traffic information pertaining to at least some of the plurality of microservices during a specified time period.

11. A method, comprising:
    obtaining a first set of traffic metrics pertaining to network traffic associated with a plurality of containers of a container-based cloud computing platform, wherein:
        the plurality of containers support a plurality of microservices; and
        a microservice has one or more corresponding microservice instances that execute in one or more of the plurality of containers;
    transforming the first set of traffic metrics into a second set of traffic metrics, the second set of traffic metrics comprising network traffic information pertaining to at least some of the plurality of microservices, the transformation being based at least in part on information pertaining to the plurality of containers and the plurality of microservices supported by the plurality of containers;
    constructing a microservice map based on the second set of traffic metrics;
    outputting the microservice map;
    determining a network policy based on the microservice map; and
    applying the network policy.

12. The method of claim 11, wherein the network policy includes a firewall rule.

13. The method of claim 11, wherein the first set of traffic metrics includes information pertaining to:
    a container associated with a corresponding microservice that is supported by the container, a source address associated with a traffic flow, a destination address associated with the traffic flow, and metric data of the traffic flow.

14. The method of claim 11, wherein the first set of traffic metrics is gathered by a plurality of service engines that are distributed on a plurality of host devices and that perform load balancing on traffic sent by instances of the plurality of microservices.

15. The method of claim 11, wherein the transforming of the first set of traffic metrics into the second set of traffic metrics includes:
    transforming the first set of traffic metrics into a set of modified traffic metrics associated with individual microservices of the plurality of microservices; and
    aggregating the set of modified traffic metrics according to their respective microservices to generate the second set of traffic metrics; wherein
        a traffic metric in the second set of traffic metrics pertains to network traffic associated with a corresponding microservice.

16. The method of claim 11, further comprising:
    receiving a request for traffic information pertaining to at least one microservice among the plurality of microservices; and wherein
    the request for traffic information includes a time range specification, and the first set of traffic metrics is obtained according to the time range specification.

17. The method of claim 11, wherein the first set of traffic metrics includes a set of container-level metrics, and the second set of traffic metrics includes a set of microservice-level metrics.

18. The method of claim 11, wherein the microservice map includes a directed graph.

19. The method of claim 11, wherein the construction of the microservice map includes performing a breadth-first search.

20. The method of claim 11, wherein the microservice map represents traffic information pertaining to at least some of the plurality of microservices during a specified time period.

21. A computer program product embodied in a tangible non-transitory computer readable storage medium and comprising computer instructions for:
    obtaining a first set of traffic metrics pertaining to network traffic associated with a plurality of containers of a container-based cloud computing platform, wherein:
        the plurality of containers support a plurality of microservices; and
        a microservice has one or more corresponding microservice instances that execute in one or more of the plurality of containers;
    transforming the first set of traffic metrics into a second set of traffic metrics, the second set of traffic metrics comprising network traffic information pertaining to at least some of the plurality of microservices, the transformation being based at least in part on information pertaining to the plurality of containers and the plurality of microservices supported by the plurality of containers;
    constructing a microservice map based on the second set of traffic metrics;
    outputting the microservice map;
    determining a network policy based on the microservice map; and
    applying the network policy.

* * * * *